(No Model.)  H. O. PEABODY.  2 Sheets—Sheet 2.

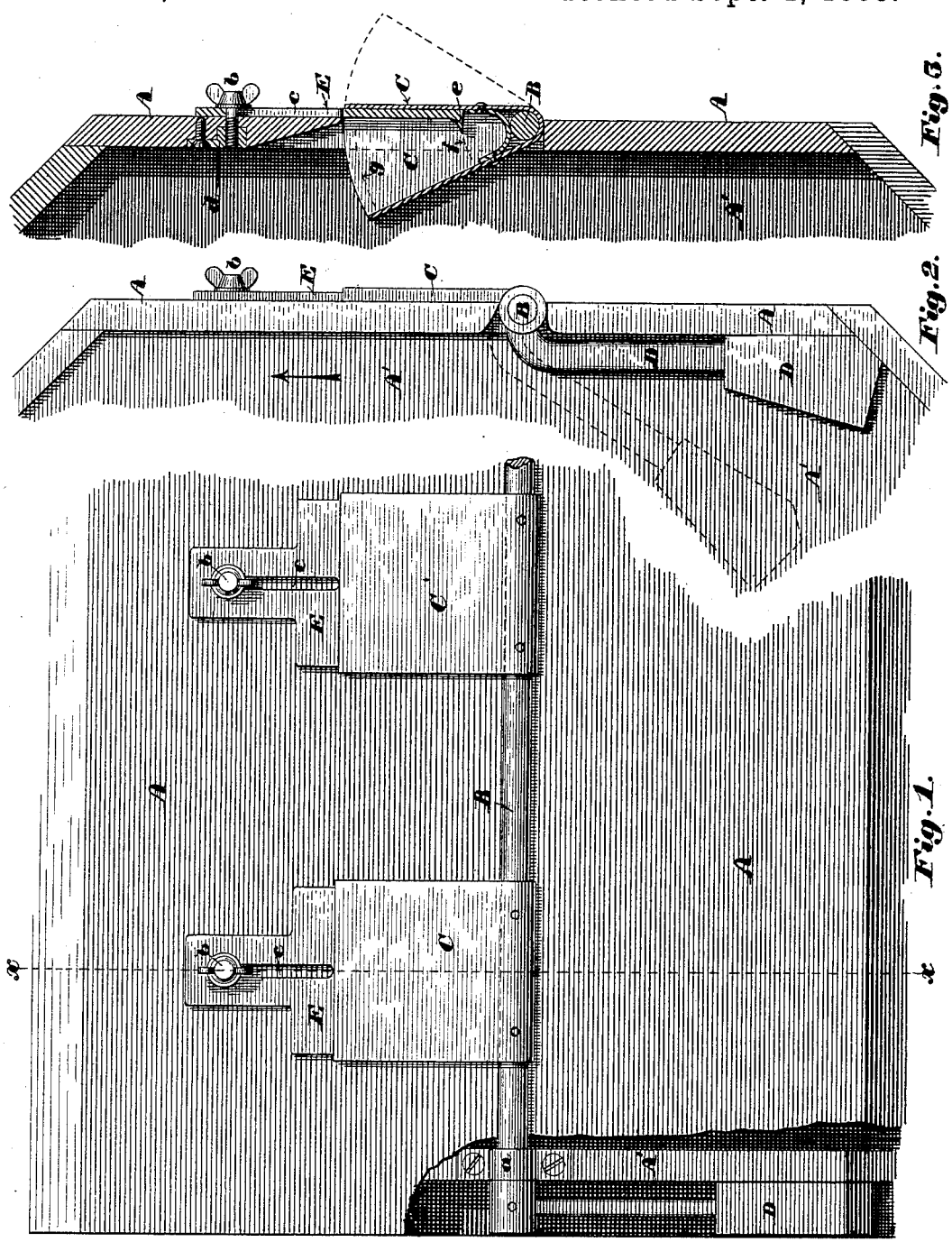

FERTILIZER DISTRIBUTER.

No. 325,269.  Patented Sept. 1, 1885.

Witnesses:

Inventor:
Henry O. Peabody,
by N. C. Lombard
Attorney.

UNITED STATES PATENT OFFICE.

HENRY O. PEABODY, OF BOSTON, MASSACHUSETTS.

FERTILIZER-DISTRIBUTER.

SPECIFICATION forming part of Letters Patent No. 325,269, dated September 1, 1885.

Application filed June 6, 1885. (No model.)

*To all whom it may concern:*

Be it known that I, HENRY O. PEABODY, of Boston, in the county of Suffolk and State of Massachusetts, have invented certain new and useful Improvements in Fertilizer-Distributers, of which the following, taken in connection with the accompanying drawings, is a specification.

My invention relates to machines for spreading or distributing fertilizers of that class which are used in a finely-pulverized condition, and is an improvement on the machine described in Letters Patent No. 309,404, issued to me December 16, 1884; and it consists in certain novel features of construction, arrangement, and combination of parts, which will be readily understood by reference to the description of the drawings, and to the claims to be hereinafter given.

Figure 4:
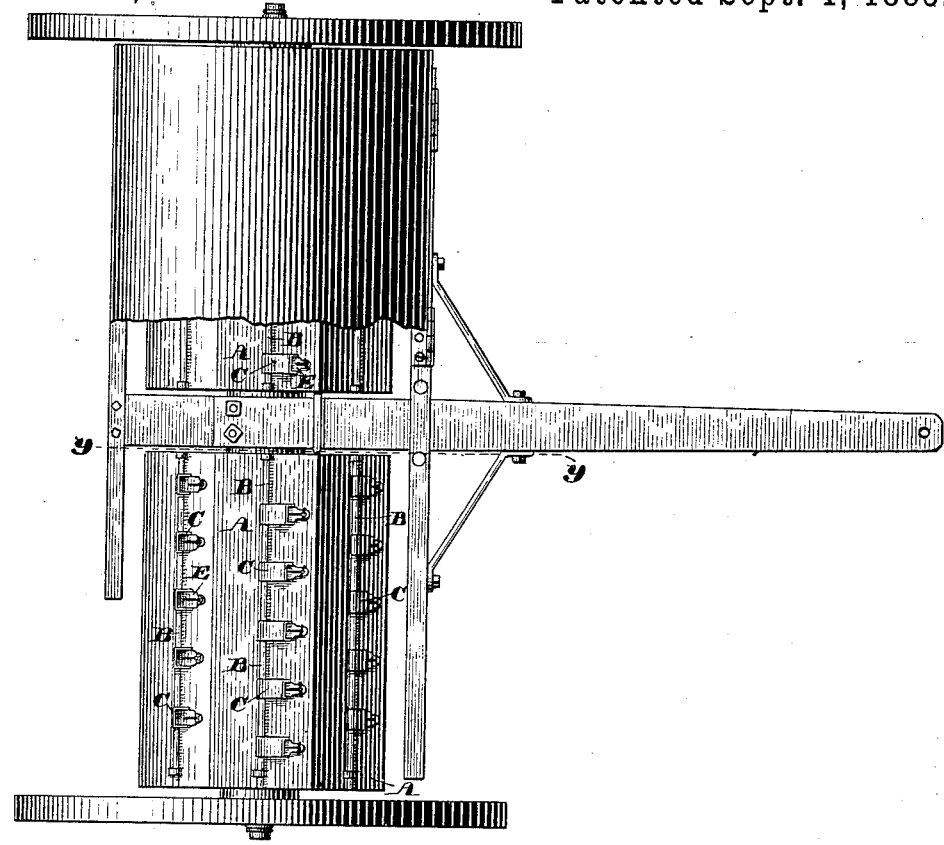
Figure 5:
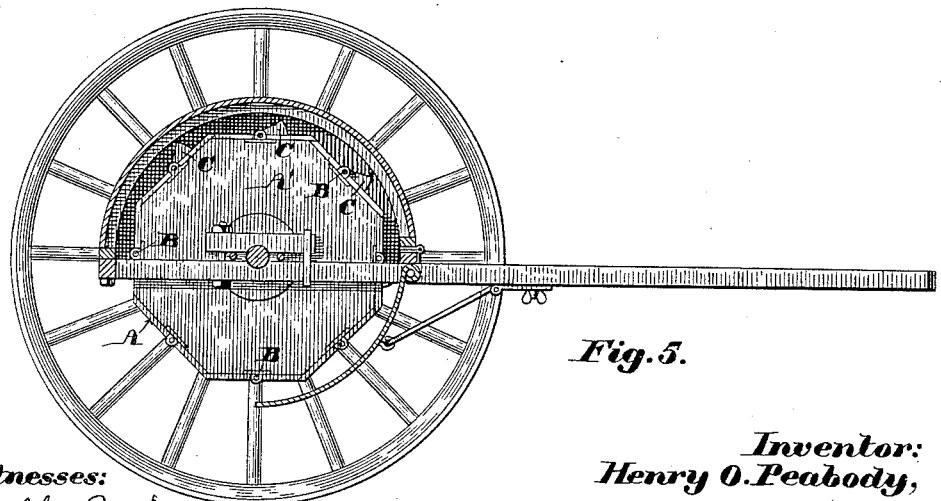

Of the drawings, Figure 1 represents a plan of so much of a fertilizer-holding drum as is necessary to illustrate my invention, a portion of the outer shell thereof being shown broken away to show the weight for operating the buckets. Fig. 2 represents an end elevation of a portion of the same. Fig. 3 represents a sectional elevation of the same, the cutting plane being taken on line $x\ x$ on Fig. 1. Fig. 4 is a plan of my improved machine with a portion of the covering-hood broken away; and Fig. 5 is a vertical transverse section of the same on line $y\ y$ on Fig. 4, and showing one of the fertilizer-holding drums in end elevation.

In the drawings, A is a drum, made polygonal in cross-section, and which is adapted to be revolved about its axis in any suitable manner, either as was described in the before-mentioned Letters Patent, or by the device shown and described by me in another application allowed May 19, 1885, of which the serial number is 162,532. Within a groove in the outer surface of said drum A is mounted, in suitable bearings, $a$, a shaft, B, to which at stated intervals are secured a number of buckets or hoppers, C C, which are adapted to vibrate about the axis of the shaft B through suitable openings cut in the shell of the drum A.

To the outer end of the shaft B, outside of the drum-head A', is secured the counterpoise-weight D, by which the buckets C C are held in a position with their mouths within the cylinder, while said buckets are at or near the lower side of said drum, and during their passage from said lowest position to a point near the upper side or highest part of said cylinder, and by which said buckets are vibrated to a position with their mouths outside of the shell of said drum when nearing said highest part of said drum, and maintained in such position until the drum has revolved so as to bring said buckets to a point near the lowest point in its revolution again, when the force of gravity acting upon the counterpoise-weight D causes the buckets to be again vibrated about their axes to a position with their mouths within the shell of the drum, as at the start, this inward and outward movement of the buckets taking place once to each revolution of the drum A, the buckets being filled with the fertilizer contained in said cylinder during the upward movement of said buckets, and discharged upon the ground, or outside of the cylinder, during the downward movement of said buckets, in an obvious manner.

In order to regulate the amount of fertilizer discharged at each revolution of the drum, a plate, E, is secured to the periphery or outer surface of the drum by means of the thumb-screw $b$, which passes through the slot $c$ in the outer end of said plate and screws into the nut $d$ upon the inside of the drum, so that said plate may be adjusted from a position within the bucket C, as shown in Fig. 3, with its knife-edged end $e$ on the dotted arc $f$ to a position with said knife-edged end $e$ on the dotted arc $g$, as shown in Fig. 3.

By the construction described all of the working parts are placed upon the outside of the hopper, which allows of a free passage of the fertilizer in the revolution of the drum, as there are no obstructions in its way, or parts that are liable to get clogged thereby.

The operation of my invention is as follows: The plates E being adjusted for each bucket C so that the same amount of fertilizer will be given forth from each bucket in one complete revolution of the drum, the said drum is revolved in the direction indicated by an arrow on Fig. 2. The buckets C C, which are at the lowest point in their revolution about the axis of the drum A, are in the position shown in Fig. 3, the weight D resting on that portion of the shell which projects beyond the head A', and retaining said buckets in that position as they move from their lowest to their highest position, during which movement the buckets are filled with the fertilizer with which the drum is filled. As the buckets arrive near their highest position, the weight D, by force of gravity, falls gradually into the position shown by dotted lines in Fig. 2, while the bucket, being attached to the same shaft B to which the weight D is secured, is moved into the position shown by dotted lines in Fig. 3, the knife-edged end $e$ of the plate E cutting through the material during said movement and allowing only that portion of the fertilizer to remain in the bucket which was within the bottom of said bucket below said knife-edge, so that as the drum continues to revolve and the bucket passes from its highest to its lowest position, the mouth thereof being on the outside of said drum, that amount of the fertilizer gaged by the knife-edged end $e$ will fall outside of said drum to the ground. This operation being repeated again and again, a uniform amount of fertilizer is scattered over the entire field which it is desired should be enriched.

What I claim as new, and desire to secure by Letters Patent of the United States, is—

1. A revolving hollow drum provided with a series of buckets mounted in apertures cut through the peripheral shell of said drum and arranged to be automatically vibrated from positions with their mouths within said drum to positions with their mouths outside of said drum, in combination with a series of non-vibrating plates or gates secured to the shell of the drum, one end of each of which enters the mouth of a bucket for the purpose of regulating the amount of fertilizer to be distributed.

2. The combination of a revolving hollow drum, a shaft mounted in suitable bearings on the outer surface of said drum, a series of buckets firmly secured to said shaft and adapted to be vibrated therewith within apertures cut through the shell of the drum, and a counterpoise-weight secured to said shaft outside the head of said drum and adapted by its own gravity to operate all of the buckets on said shaft.

3. The combination of a revolving hollow drum, a shaft mounted in suitable bearings on said drum, a series of buckets firmly secured to said shaft and adapted to be vibrated therewith within apertures cut through the shell of the drum, a counterpoise-weight secured to said shaft and adapted to operate by its own gravity all the buckets on said shaft, and a series of plates or gates one end of each of which enters the mouth of one of the buckets, while its opposite end is adjustably secured to said drum, so that its inner end may be moved to a position at a greater or less distance from the pivot of said bucket, for the purpose of gaging the amount of fertilizer to be distributed.

4. A revolving hollow drum provided with a series of buckets mounted in apertures cut through the peripheral shell of said drum and arranged to be automatically vibrated from positions with their mouths within said drum to positions with their mouths outside of said drum, in combination with a series of non-vibrating plates or gates secured to the shell of the drum, one end of each of which is provided with a laterally-projecting knife-edged rib and enters the mouth of a bucket for the purpose of regulating the amount of fertilizer to be distributed.

In testimony whereof I have signed my name to this specification, in the presence of two subscribing witnesses, on this 4th day of June, A. D. 1885.

HENRY O. PEABODY.

Witnesses:
  WALTER E. LOMBARD,
  FRANK E. BRAY.